(12) United States Patent
Feddrix et al.

(10) Patent No.: US 7,081,235 B2
(45) Date of Patent: Jul. 25, 2006

(54) CATHODE MATERIALS FOR PRIMARY BATTERIES

(75) Inventors: Frank H. Feddrix, Westlake, OH (US); Robert M. Estanek, Amherst, OH (US); Scott W. Donne, Garden Suburb (AU)

(73) Assignee: Eveready Battery Company, Inc., St. Louis, MO (US)

( * ) Notice: Subject to any disclaimer, the term of this patent is extended or adjusted under 35 U.S.C. 154(b) by 531 days.

(21) Appl. No.: 10/297,026

(22) PCT Filed: Jun. 1, 2001

(86) PCT No.: PCT/US01/17841

§ 371 (c)(1),
(2), (4) Date: Apr. 22, 2003

(87) PCT Pub. No.: WO01/93352

PCT Pub. Date: Dec. 6, 2001

(65) Prior Publication Data

US 2003/0215385 A1 Nov. 20, 2003

(51) Int. Cl.
- *C01G 45/02* (2006.01)
- *C01G 25/02* (2006.01)
- *H01M 6/04* (2006.01)
- *H01M 6/50* (2006.01)

(52) U.S. Cl. ............... 423/599; 423/594.12; 429/206; 429/218.1; 429/224; 429/232; 252/519.1

(58) Field of Classification Search ............... 429/206, 429/218.1, 224, 231.5, 232; 423/599, 594.12; 252/519.1

See application file for complete search history.

(56) References Cited

U.S. PATENT DOCUMENTS

| | | | |
|---|---|---|---|
| 6,440,181 B1 * | 8/2002 | Bowden et al. | 29/623.1 |
| 6,780,393 B1 * | 8/2004 | Murayama et al. | 423/592.1 |
| 6,916,580 B1 * | 7/2005 | Cho et al. | 429/231.1 |
| 2003/0215712 A1 * | 11/2003 | Feddrix et al. | 429/224 |

FOREIGN PATENT DOCUMENTS

| | | | |
|---|---|---|---|
| FR | 2718728 | * | 10/1995 |
| WO | WO 98/22387 | * | 5/1998 |

OTHER PUBLICATIONS

Qixin et al. "The Formation and Electrochemical Activity of Fibrous Electrolytic Manganese Dioxide" Fall Meeting-Electrochemical Society, New Orleans LA USA, vol. 84-2, 1984, pp. 126-127, XP-002188790.*

* cited by examiner

*Primary Examiner*—Stanley S. Silverman
*Assistant Examiner*—Timothy C. Vanoy
(74) *Attorney, Agent, or Firm*—Michael C. Pophal

(57) ABSTRACT

The cathode of a primary alkaline battery is composed of electrode grade manganese dioxide containing Zr.

30 Claims, 2 Drawing Sheets

CATHODE MATERIALS FOR PRIMARY BATTERIES

FIELD OF THE INVENTION

The present invention relates to improved positive electrode materials for use in batteries, especially primary alkaline batteries.

BACKGROUND

Japanese Patent No. 54-1011 (Kokai 48-51222) teaches that the number of charge/discharge cycles a secondary battery can perform at an acceptable capacity level can be improved by incorporating about 5 wt. % (about 20,000 ppm) of a dopant selected from Ti, Zr, Hf, Sb and Bi into the battery's cathode. Curves A, B, and C in FIG. 2 of JP 54-1011, which summarize the patent's working examples, show this effect. At the same time, however, these curves (along with Curve D) also show that no enhancement in initial discharge capacity is achieved by this approach. Accordingly, JP 54-1011 offers no help in providing new alkaline batteries having enhanced discharge capacities, which is the object of the present invention.

SUMMARY OF THE INVENTION

In accordance with the present invention, it has been found that alkaline batteries exhibiting enhanced discharge capacities can be made by including the Zirconium Manganese Oxide in the cathodes of these batteries.

It is an object of the present invention to prepare a composition of matter corresponding to the formula $Mn_{1-x}Zr_xO_y$, in which x is about 0.0037 to 0.0144, and y ranges from about 1.90 to 2.00, in which the manganese, zirconium and oxygen are intermingled atomically. More wherein x is about 0.0046 to 0.0096, and most preferably wherein x is about 0.0056 to 0.0087. Alternatively the new material can be described as a composition of matter comprising zirconium, manganese and oxygen, having a Zr/Mn mole ratio in the range of 0.0037 to 0.0145, and wherein the average manganese oxidation state is in the range of +3.80 to +4.00. This new composition can be prepared by electrodeposition of a solution containing manganese and zirconium.

The electrode grade zirconium manganese oxide has a predominantly fibrous morphology, with the fibers having diameters on the order of 10–100 nanometers and lengths on the order of 1 to 100 micrometers. The fibers are composed of single crystals having a ramsdellite, pyrolusite or a $MnO_2$-epsilon crystal structure. Furthermore the zirconium manganese oxide of the present invention has a surface area of 50 to 100 $m^2/g$ when measured by the BET method using nitrogen adsorption.

It is a further object of the present invention to make electrodes comprising zirconium manganese oxide. The electrode grade zirconium manganese oxide of the present invention can be used to make an electrode for an alkaline battery comprising the zirconium manganese oxide and a conductive material. Such electrodes exhibit an initial discharge capacity of 970 C/g or more (initial discharge capacity as high as 1060 C/g has been found) when measured at a constant current discharge of 10 mA/g. Preferably the comined amounts of the conductive material and the zirconium manganese oxide comprise at least ninety weight percent of the electrode on a dry basis.

Improved electrode performance has been found when the zirconium manganese oxide of the present invention has been included in amounts as little as one weight percent on a dry electrode basis. It is more preferred when concentrations of the zirconium manganese oxide ranges from at least ten percent to at least forty five percent of the electrode dry weight. The conductive material added to the electrode is preferably carbon, and more preferably graphite. The electrode mix can also include electrolytic manganese dioxide as a co-depolarizer.

It is a further object of the present invention to make improved batteries. The above described electrodes can be used as electrodes in batteries or the present invention, preferably as cathodes, with zinc as an active material in the anode and potassium hydroxide as a component of the electrolyte.

It is a further object of the present invention to prepare the zirconium manganese oxide using a method which eliminates stray plating. The above described zirconium manganese oxide of the present invention can be manufactured using a method of making electrode grade zirconium manganese oxide in a bath containing an anode and cathode electrode. The method comprising the steps of adding a solution of soluble manganese and zirconium in the bath, and plating zirconium manganese oxide onto the anode. The solution is preferably heated to a temperature between 90 to 100 degrees Celsius. The preferable soluble manganese is manganese sulfate, and the preferable soluble zirconium is zirconium sulfate. During the plating step a deposition current density of between 20 and 100 $A-m^2$ is preferably used. This method of the present invention surprisingly results in the elimination of stray plating.

BRIEF DESCRIPTION OF THE DRAWINGS

The present invention may be more readily understood by reference to the following drawings wherein.

DETAILED DESCRIPTION

Figure 1:
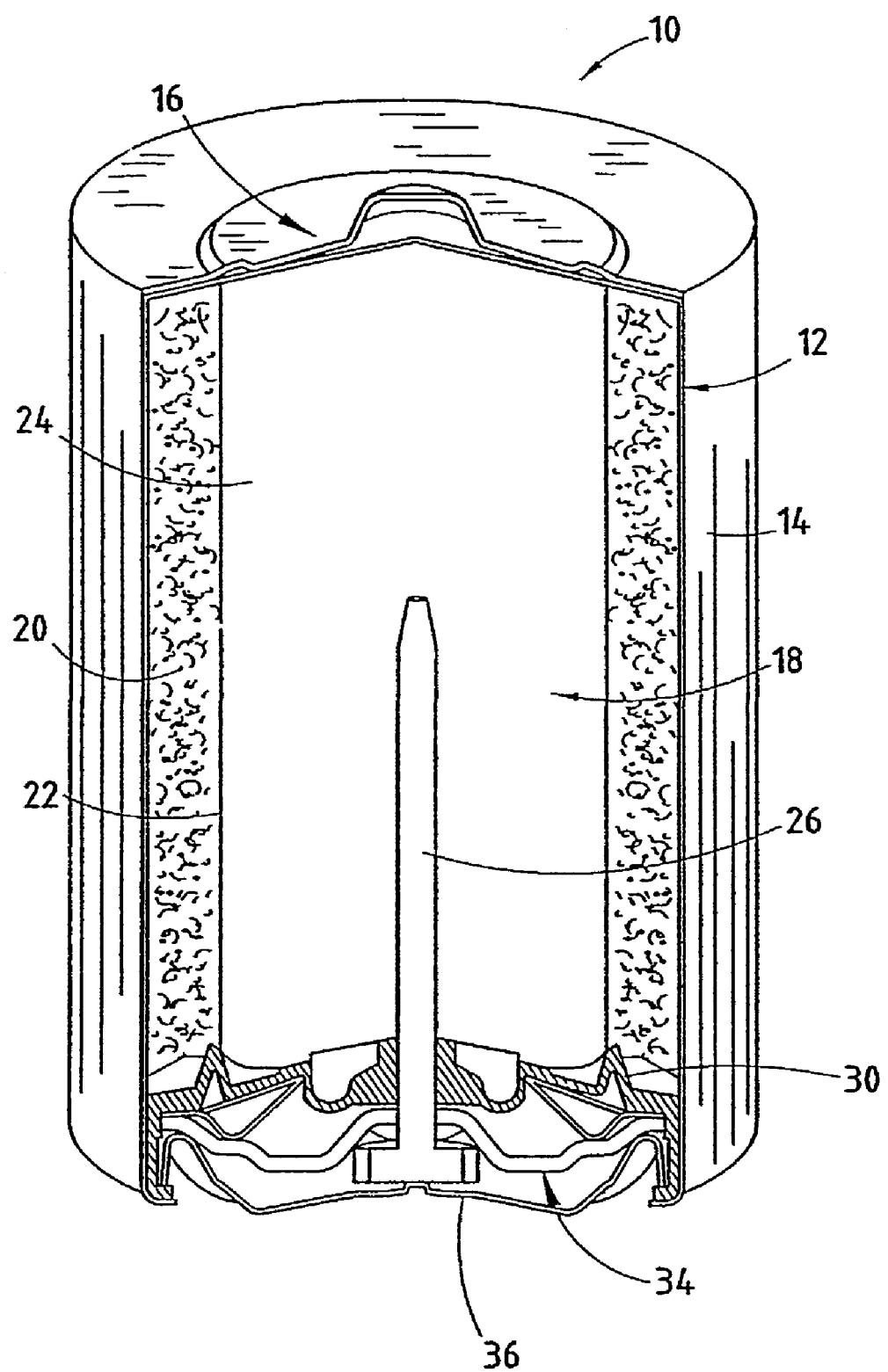
FIG. 1 is a sectional view of a primary alkaline battery made in accordance with the present invention.

Referring to FIG. 1, a cut away view of a cylindrical alkaline electrochemical cell 10 is shown. Alkaline cell 10 includes a steel can 12 having a cylindrical shape with a closed bottom end and an open top end. A metalized, plastic film label 14 is formed about the exterior surface of steel can 12, except for the ends of steel can 12. At the closed end of steel can 12 is a positive cover 16 preferably formed of plated steel. Film label 14 is formed over the peripheral edge of positive cover 16. A cathode 20, typically formed of a mixture of manganese dioxide, graphite, a 45% potassium hydroxide solution, water, a binder and additives, is formed about the interior surface of steel can 12. A separator 22, which is preferably formed of a non-woven fabric that prevents migration of any solid particles in the cell, is disposed about the interior surface of cathode 20. An alkaline electrolyte 24, preferably formed of potassium hydroxide (KOH), is disposed in the can 12, preferably within the interior of separator 22. An anode 18, preferably formed of zinc powder, a gelling agent, and additives is disposed within electrolyte 24 in contact with a current collector 26, which may include a brass nail. Accordingly, cathode 20 is configured as the positive electrode of the cell and the anode 18 is configured as the negative electrode of the cell.

A seal 30, preferably of nylon, is formed at the open end of steel can 12 to prevent leakage of the active materials contained in steel can 12. Seal 30 contacts a metal washer 28 and an inner cell cover 34, which is preferably formed of steel. A negative cover 36, which is preferably formed of plated steel, is disposed in contact with current collector 26 by a weld. Negative cover 36 is electrically insulated from steel can 12 by nylon seal 30. Current collector 26 is electrically connected to negative cover 36. The anode 18 of the present invention preferably contains zinc powder as the electrochemically active material. The cathode electrode 20 of the present invention is typically formed of electrolytic manganese dioxide (EMD) as the electrochemically active material. In addition, anode 18 and cathode 20 of the present invention may also contain one or more additives. It is contemplated that other anodes, cathodes, electrolytes, and separators may be used in accordance with the present invention.

In the particular embodiment shown, battery 10 is a primary alkaline battery. Accordingly, cathode 32 is composed of about 2 to 15 wt. % of an electrically conductive material, 80 wt. % or more of a zirconium manganese oxide made in accordance with the present invention, and other optional ingredients as discussed below. In this regard, wt. % refers to the amount of indicated ingredient in relation to the dry weight of all ingredients in the cathode. Cathodes for alkaline batteries are normally made with aqueous materials such as KOH solutions, solutions or dispersions of resinous binders and solutions or dispersions of slip agents and other adjuncts. The weight percents given herein for the ingredients of the cathode are based on the total dry weight of these ingredients, the water content of these ingredients being excluded.

The present invention is also equally applicable to secondary alkaline batteries. Theoretically, primary and secondary batteries are essentially the same. Commercially, however, there are some important structural differences.

For example, an important design requirement for commercial secondary alkaline batteries is service life—i.e., the ability of the battery to perform repeated charge/discharge cycles at an acceptable capacity level. Because manganese dioxide expands and contracts when charged and discharged, cathodes made from this material must include special design features to accommodate this expansion and contraction. Thus, significant amounts of organic binder as well as graphite and/or carbon black are normally included in such electrodes to provide structural integrity. "Cages" or other structures can also be provided to surround and contain the cathode material. The net effect is that the manganese dioxide content in such cathodes is typically on the order of 50 to 75 wt. % or so on a dry weight basis. Even in Japanese Patent No. 54-1011 (as well as German Patent DE 3,337,568 A1), the maximum manganese dioxide content in the cathodes is less than 80 wt. %.

The current collector material used in the inventive cathode is normally graphite or carbon black. Other alkali-resistant, electrically-conductive, non-reactive, normally-particulate materials can also be used. Graphite and carbon black, especially mixtures thereof, are preferred. Although cathodes made in accordance with the present invention for use in primary alkaline batteries can contain as much as 15 wt. % of the current collector material, preferred cathodes contain 10 wt. % or less, more preferably 7 wt. % or less. Cathodes containing 5 wt. % or less, or even 4 wt. % or less, and even as little as 1 to 2 wt. % conductive material are especially preferred for primary alkaline battery use.

The inventive cathodes can also include one or more binder materials. Many different types of binder materials can be used. For example, water-insoluble, hydrophobic particulate synthetic resinous materials such as polyetrafluoroethylene and polyethylene can be used. See commonly-assigned U.S. Pat. No. 5,895,735, the disclosure of which is incorporated herein by reference. Monomers and prepolymers which polymerize to form such polymers in situ such as epoxy resins can also be used. Water-insoluble thermoplastic and thermosetting resins can also be used, although it is desirable to avoid heating the manganese dioxide cathode material over about 130° C. See the above-noted Japanese Patent No. 54-1011.

In addition to water-insoluble hydrophobic synthetic resinous materials, water-insoluble, hydrophilic resinous materials can also be used. Examples are acrylic polymers and copolymers, and naturally-occurring resinous materials such as gum arabic and potato starch can also be used. Polyacrylic acid polymers and copolymers which also function as superabsorbents such as Carbopol®, which is a cross-linked polyacrylic acid available from the PMD Group, Inc, predecessor-in-interest to the Performance Materials Division of the BF Goodrich Company, Inc., are especially interesting.

Non-resinous binders can also be used. Examples are Portland cement.

In the case of cathodes made in accordance with the present invention for use in primary alkaline batteries, the amount of binder in the cathode can be as much as 15 wt. %. However, binder loadings on the order of about 0 to 5 wt. %, more especially about 0.2 to 3 wt. %, are more typical so as to keep as much manganese dioxide in the cathode as possible.

In addition to the above ingredients, the inventive cathode when in an "in-use" condition also contains an alkaline material and water. Although any suitable alkaline material can be used, NaOH and KOH, especially KOH, are preferred. Any conventional amount of alkaline electrolyte solution material can be included in the inventive cathode, such as 0.5 to 10 wt. %, for example. More typically, the amount of alkaline electrolyte solution will be about 1 to 6 wt. % or even about 1.5 to 5 wt. %. for primary alkaline batteries. As known in the art, the amount of electrolyte solution used depends on its concentration, as well as the corresponding amounts of other active materials.

In accordance with the present invention, the discharge capacities of alkaline batteries can be enhanced by including in the cathode material the zirconium manganese oxide material. This may be more easily understood by reference to FIG. 2, which is a graph illustrating the initial discharge capacities of a number of otherwise identical cathodes made from the zirconium manganese oxide in accordance with the present invention and containing various amounts of Zirconium. As can be seen from this figure, initial discharge capacity varies considerably based on Zirconium content, with cathodes containing about 4,000 to 15,000 ppm Zirconium (on a dry weight basis) exhibiting substantially greater initial discharge capacities than cathodes containing other amounts of Zirconium or no Zirconium at all.

Figure 2:
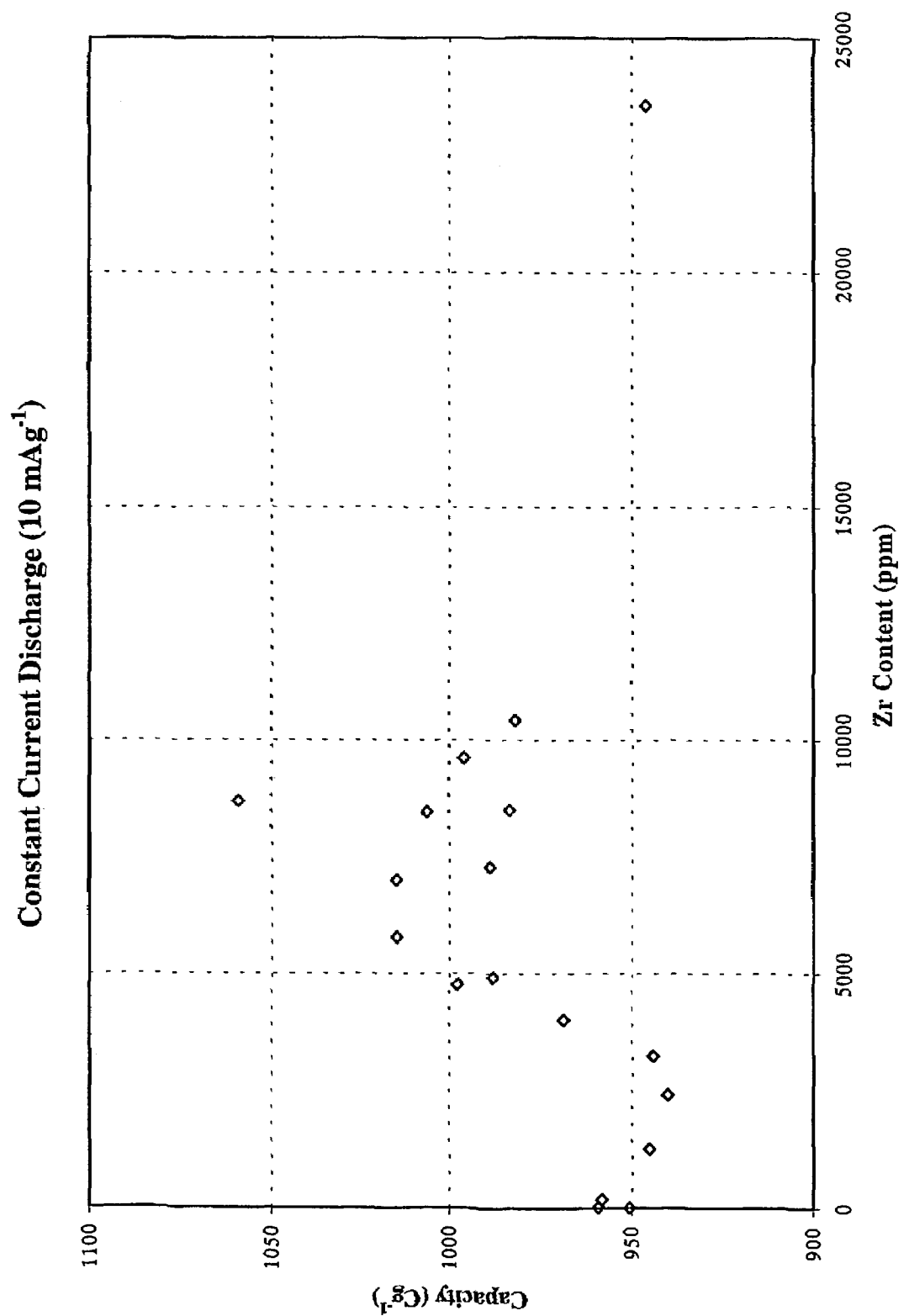
FIG. 2 is a plot showing the relationship between initial discharge capacity and Zr content in a battery made in accordance with the present invention.

In particular, FIG. 2 shows that cathodes containing about 4,000 to 15,000 ppm Zirconium on a dry weight basis exhibit initial discharge capacities as high as 1060 C/g or more when measured at a constant current discharge of 10 mA/g, as more thoroughly described in connection with the following working examples. This compares quite favorably to the conventional cathode (containing no Zirconium), whose initial discharge capacity is about 950 C/g, as well as to the cathode of the above-mentioned Japanese Patent No. 54-1011 (containing about 20,000 ppm Zr) whose initial discharge capacity would equal to or less than 950 C/g, based on the data of FIG. 2. FIG. 2 further shows that initial discharge capacities of at least about 980 C/g or more, 1000 C/g or more and even as much as the aforementioned 1060 C/g, can be obtained when the cathodes of the present invention preferably contain about 5,000 to 10,000 ppm Zr, more preferably about 6000 to 9,000 ppm, or even about 8,500 ppm Zr.

The inventive electrode grade zirconium manganese oxide can be viewed as corresponding to the formula $Mn_{1-x}Zr_xO_y$, in which x is about 0.0037 to 0.0144, and y ranges from about 1.90 to 2.00. This corresponds to manganese oxide containing about 4,000 to 15,000 ppm Zr on a dry weight basis i.e., based on the combined weights of manganese, oxygen and Zirconium. In the preferred zirconium manganese oxide material of the present invention containing about 5,000 to 10,000 ppm Zr, x in this formula is about 0.0046 to 0.0096, while in manganese oxide containing about 6000 to 9,000 ppm, x is about 0.0056 to 0.0087. In manganese oxide containing 8,500 ppm Zr, x is about 0.0080.

As indicated above, it is already known that certain dopants will enhance the service lives of manganese oxide cathodes in secondary batteries. In addition, some references state that these dopants can be added to the manganese dioxide by simple mixing of the oxides of the dopants with manganese dioxide, by chemical techniques in which ions of the dopants are co-precipitated with the manganese dioxide, and by electrochemical techniques in which ions of the dopants are co-deposited from the electrolytic bath used to produce electrolytic manganese dioxide (EMD). See the above-noted Japanese Patent No. 54-1011 and German Patent DE 3,337,568 A1, the disclosures of which are incorporated herein by reference.

In accordance with the present invention, however, it has been found that a Zirconium manganese oxide material will enhance the discharge capacities of alkaline cathodes, but only if it is added to the manganese oxide by co-precipitation or co-electrodeposition techniques. Methods where the resulting zirconium manganese oxide contains the atomic structure, physical properties, electrochemical properties and morphology may be equivalent, however simple admixture of oxides or oxides with adsorbed ions will not work This is particularly surprising in light of Japanese Patent No. 54-1011 which in FIG. 2 shows that neither the method of dopant addition (Curves A & B vs. C) nor the presence or absence of dopant (Curves $D_1$ vs. A, B &C) affects initial cathode performance in secondary batteries.

Thus, an important feature of the present invention is that the Zirconium is incorporated into the manganese oxide microstructure used to make the inventive cathodes by coprecipitation or co-electrodeposition techniques so that the dopant elements will be intimately intermixed with the Manganese and Oxygen on an atomic basis. In other words, the dopant elements need to be intimately intermixed with the crystal lattice or matrix of the electrode-grade manganese oxide material and not merely present in gross admixture. Other manufacturing techniques, in addition to coprecipitation or co-electrodeposition, which also achieve a similar intimate admixture of the dopant with the $MnO_2$ can also be used.

A further unique feature of the inventive zirconium manganese oxide is that it exhibits a surface area of 50 to 100 $m^2/g$ when measured by the BET surface area method using nitrogen adsorption at 77K. Surface areas on the order of 60 to 90 $m^2/g$, or even about 80 $m^2/g$, are especially preferred. This is significantly in excess of the surface area of conventionally prepared battery grade electrolytic manganese dioxide, which is about 30 $m^2/g$ when measured by this method.

The inventive zirconium manganese oxide also exhibits a unique crystal structure, relative to conventional battery grade EMD, when measured by transmission electron microscopy ("TEM"). In this connection, conventional X-ray diffraction of EMD produces severe broadening and low intensity of crystal plane reflections and consequently is a poor tool to distinguish between materials. This effect is not seen in TEM, and the associated electron diffraction patterns, and so it is believed to be a more accurate means of determining structural features of these materials.

In any event, the inventive zirconium manganese oxide, when analyzed by TEM, exhibits a predominantly fibrous morphology with the fibers appearing to be arranged both individually and in bundles. These fibers have diameters on the order of 10–100 nm and lengths on the order of 1 to 100 micrometers and appear to be composed of single crystals that share a common crystal orientation as reflected by their electron diffraction patterns. These fibers tend to be oriented perpendicular to the electrode on which the deposit is grown, or in other words grow in the direction of the deposition of the zirconium manganese oxide. The zirconium seems to cause the nucleated crystallites to grow preferentially in one direction, giving rise to a fibrous morphology. The crystal types observed in this structure are ramsdellite, pyrolusite, and epsilon —$MnO_2$.

Other features of the inventive zirconium manganese oxide, at least in some instances, is that it has a resistivity greater than 400 ohm-cm as well as a density between 4.00 $g/cm^3$ and 5.00 $g/cm^3$, more typically between 4.25 and 4.75 $g/cm^3$.

The production of the zirconium manganese oxide is more fully described below. However, during the electrolytic deposition of EMD, some material is deposited in places other than at the anode. This other material is known as hydrolytic MnO2 or stray plating. The unwanted stray plating occurs on evaporation prevention blankets, solution piping, the container, on the various instruments used for monitoring or controlling plating conditions, and other locations which do not possess anodic potential. This stray plating is an inefficiency in the process leading to wasted raw material, reduction in the effectiveness of sensors, and additional maintenance of the manufacturing process. It has been surprisingly found that the addition of Zirconium sulfate or other dopants to the plating bath eliminates that stray plating. Only small amounts of the dopant is required to accomplish this effect. In the case of zirconium, 100 ppm zirconium concentration in the plating bath substantially reduced the stray plating, whereas concentration at 200 ppm zirconium or above eliminates the stray plating.

WORKING EXAMPLES

In order to more thoroughly describe the present invention, the following working examples are presented:

Example 1

Preparation of the Zirconium Manganese Oxide:

The zirconium manganese oxide of the present invention were made using an electrochemical technique similar to that used to prepare conventional electrolytic manganese dioxide. The equipment necessary to produce EMD on the bench-top scale essentially revolves around a 2 L glass beaker that functions as the electrolysis cell. In this, there are two titanium anodes (146.4 cm² each) surrounded by, and mounted parallel to, three graphite cathodes of the same surface area. Current for electrolysis is supplied by an external power supply that can be either manually or computer controlled. So as to maintain a constant bath composition over the course of an experiment, spent electrolyte ($MnSO_4/H_2SO_4$) is removed continuously from the plating bath and replaced at the same rate with feed electrolyte ($MnSO_4$). The rate of spent electrolyte removal and feed electrolyte addition is determined by the desired electrolyte concentration and the deposition current density. For the synthesis of zirconium manganese oxides a pre-determined amount of zirconium was added to the starting electrolyte and the feed electrolyte as zirconium sulfate. The amount of soluble zirconium in the plating bath has been observed as roughly one tenth the concentration found in the resulting deposit. Therefore the zirconium concentration of the deposit is roughly ten times the concentration of the zirconium ion in the plating bath solution. Temperature is maintained by an external heating jacket that surrounds the electrolysis bath.

A similar procedure has been used to manufacture zirconium manganese oxides on a larger scale, but there are some minor differences. On a larger scale it is preferable to have a separate stream for the introduction of zirconium to the plating bath, instead of as a component of the feed solution. Furthermore, heating of production scale plating cells is typically via an immersion heater, instead of the jacket used in this apparatus. Also no stray plating is observed in either the bench scale or larger scale processes.

Zirconium manganese oxide deposition occurs from a hot (90°–100° C.) solution of acidic (15–45 $gL^{-1}$ $H_2SO_4$) $MnSO_4$ (20–80 $g \cdot L^{-1}$). Typical deposition current densities are from 20–100 $A \cdot m^{-2}$. Preferred deposition current densities are about 60 $A \cdot m^{-2}$. The general electrochemical reactions that occur during Zirconium manganese oxide synthesis are as follows:

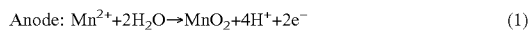

Anode: $Mn^{2+}+2H_2O \rightarrow MnO_2+4H^++2e^-$ (1)

Cathode: $2H^++2e^- \rightarrow H_2$ (2)

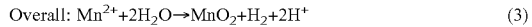

Overall: $Mn^{2+}+2H_2O \rightarrow MnO_2+H_2+2H^+$ (3)

It is believed that Zirconium does not undergo an electrochemical reaction. It is instead included attracted into the atomic matrix by adsorption onto the manganese oxide deposit. Once adsorbed it becomes atomically bonded to the manganese and oxygen atoms.

Following production, the zirconium manganese oxide was mechanically removed from the anodes and broken up into small (1–2 cm) pieces. These pieces are then washed with de-ionized water and dried at ~70° C. before being milling using a bench-top micro-mill. Special attention was paid to the milling time, since extended milling will lead degradation in electrochemical performance. The milled sample was passed through a 108 µM sieve to remove coarse particles. The powder was then suspended in de-ionized water and neutralized by the addition of 0.5 M NaOH until the pH of the suspension was stable in the range 6.5–7.0. The suspension was then filtered, and the collected solid washed thoroughly with de-ionized water. Finally, the solids were dried at ~70° C. in air. The procedure described here for post-synthesis treatment zirconium manganese oxides is similar to that used commercially, but it should be pointed out that both the Zirconium manganese oxide can be treated similarly to EMD no matter what the treatment.

Example 2

Preparation of the Cathode Electrode:

Each Zirconium manganese oxide sample so made was then formulated into a "blackmix" composition composed of approximately 45 wt. % of the zirconium manganese oxide being tested, 45 wt. % KS6 Graphite supplied by Timcal and 10 wt. % 9M KOH in water. The precise amount of Zirconium manganese oxide and graphite used were selected so that each test electrode contained exactly 0.20 grams Zirconium manganese oxide.

The blackmix compositions so formed were then formed into test electrodes measuring 25.4 mm in diameter and approximately 1 mm thick by compression molding under 1000 kg.

Example 3

Testing of the Electrodes:

The data in the abovementioned FIG. 2 was developed by testing a series of Zirconium manganese oxide electrodes made in accordance with the general principles of the invention as described in Examples 1 and 2, and containing differing amounts of Zr. Testing was done with the Zirconium manganese oxide samples being in the form of planar electrodes containing a large excess of graphite conductor and electrolyte. With this excess, mass transport problems associated with poor electronic conductivity and electrolyte availability are avoided. The response during electrochemical testing is therefore due solely to the Zirconium manganese oxide.

The electrodes were tested using an electrochemical cell consisting of a stainless steel current collector, onto which the electrode was mounted, as well as a Hg/HgO reference electrode and Pt counter electrode. Each electrode was arranged in contact with the current collector in an individual cell and covered with three layers of commercially available separator paper and then a nylon perforated disk. The electrode, separator papers and nylon perforated disk were held in place under constant pressure by a screw fixture in the cell. Additional 9 M KOH electrolyte (~10 ml) was added to the cell. The counter and reference electrodes were immersed in the electrolyte, and then a constant current of 10 $mA \cdot g^{-1}$ of test sample was applied between the counter electrode and current collector to cause reduction of the test sample. As reduction was proceeding, the voltage difference between the reference electrode and current collector was measured as a function of time, with the test being terminated when the voltage reached –0.75 V versus the Hg/HgO reference electrode. The discharge capacity for each electrode was calculated by determining the time taken to a particular voltage cut-off of –0.4V versus Hg/HgO and multiplying it by the current that was used.

As discussed above in connection with FIG. 2, the results obtained show that Zirconium manganese oxide containing 4,000 to 15,000 ppm Zirconium on a dry weight basis exhibits an initial discharge capacity of about 970 C/g or more under the particular test conditions used. This compares quite favorably with the 950 to 960 C/g exhibited by conventional manganese dioxide containing no Zirconium as well as the manganese dioxide shown in the above-mentioned Japanese Patent No. 54-1011 (containing about 20,000 ppm Zr). These results further show that initial discharge capacities of at least about 980 C/g or more, 1000 C/g or more and even as much as 1060 C/g, can be obtained using the preferred Zirconium manganese oxide compositions of the invention containing about 5,000 to 15,000 ppm Zr, more preferably about 6000 to 9,000 ppm, or even about 8,500 ppm Zr, respectively.

Although only a few embodiments of the present invention have been described above, it should be appreciated that many modifications can be made without departing from the spirit and scope of the invention. All such modifications are intended to be included within the scope of the present invention, which is to be limited only by the following claims.

We claim:

1. A composition of matter corresponding to the formula $Mn_{1-x}Zr_xO_y$, in which x is about 0.0037 to 0.0144, and y ranges from about 1.90 to 2.00, in which the manganese, zirconium and oxygen are intermingled atomically.

2. The composition of claim 1, wherein x is about 0.0046 to 0.0096.

3. The composition of claim 2, wherein x is about 0.0056 to 0.0087.

4. The composition of claim 1, where the composition of matter is prepared by electrodeposition of a solution containing manganese and zirconium.

5. A composition of matter comprising zirconium, manganese and oxygen, having a Zr/Mn mole ratio in the range of 0.0037 to 0.0145, and wherein the average manganese oxidation state is in the range of +3.80 to +4.00.

6. The composition of claim 5, where the composition of matter is prepared by electrodeposition of a solution containing manganese and zirconium.

7. Electrode grade zirconium manganese oxide having a predominantly fibrous morphology.

8. The electrode grade zirconium manganese oxide of claim 7 wherein the fibrous morphology includes fibers having diameters on the order of 10–100 nanometers and lengths on the order of 1 to 100 micrometers.

9. The electrode grade zirconium manganese oxide of claim 7 having a surface area of 50 to 100 m$^2$/g when measured by a BET method using nitrogen adsorption.

10. The electrode grade zirconium manganese oxide of claim 7 wherein the fibrous morphology is composed of single crystals having a ramsdellite, pyrolusite or a $MnO_2$-epsilon crystal structure.

11. An electrode for an alkaline battery, comprising zirconium manganese oxide and a conductive material, wherein the electrode exhibits an initial discharge capacity of 970 C/g or more when measured at a constant current discharge of 10 mA/g.

12. The electrode of claim 11, wherein said electrode comprises at least 45% by weight of the zirconium manganese oxide.

13. The electrode of claim 11 wherein the zirconium manganese oxide corresponds to the formula $Mn_{1-x}Zr_xO_y$ in which x is about 0.0037 to 0.0144, and y ranges from about 1.90 to 2.00.

14. The electrode of claim 12, exhibiting an initial discharge capacity of 980 C/g or more.

15. The electrode of claim 12, exhibiting an initial discharge capacity of 1000 C/g or more.

16. The electrode of claim 11, wherein said conductive material is carbon.

17. The electrode of claim 16, wherein said conductive material is graphite.

18. The electrode of claim 11, farther comprising electrolytic manganese dioxide.

19. The electrode of claim 18, wherein said zirconium manganese dioxide comprises at least one weight percent of the electrode on dry basis.

20. The electrode of claim 18, wherein said zirconium manganese dioxide comprises at least ten weight percent of the electrode on dry basis.

21. The electrode of claim 11, wherein the combined weight of the conductive material and the zirconium manganese oxide comprise at least ninety weight percent of the electrode on a dry basis.

22. A battery in which at least one electrode in the battery is the electrode of claim 11.

23. The battery of claim 22, wherein the cathode of the battery is formed from the electrode of claim 11.

24. The battery of claim 22, wherein the anode of the battery comprises zinc.

25. The battery of claim 22, wherein the electrolyte of the battery comprises potassium hydroxide.

26. The battery of claim 22, wherein the combined weight of the conductive material and the zirconium manganese oxide comprise at least ninety weight percent of the electrode on a dry basis.

27. A method of making electrode grade zirconium manganese oxide in a bath containing an anode and cathode electrode, comprising the steps of:
    adding a solution of soluble manganese and zirconium in the bath; and
    plating zirconium manganese oxide onto the anode.

28. The method of claim 27, wherein said soluble manganese is manganese sulfate, and said zirconium is zirconium sulfate.

29. The method of claim 27 wherein in the plating step a deposition current density of between 20 and 100 A-m$^2$ is used.

30. The method of claim 27, comprising the further step of heating the solution to a temperature between 90 to 100 degrees Celsius.

* * * * *